Jan. 1, 1952 W. P. WEIDINGER 2,580,711
LIQUID GAUGE BAR
Filed Aug. 15, 1949
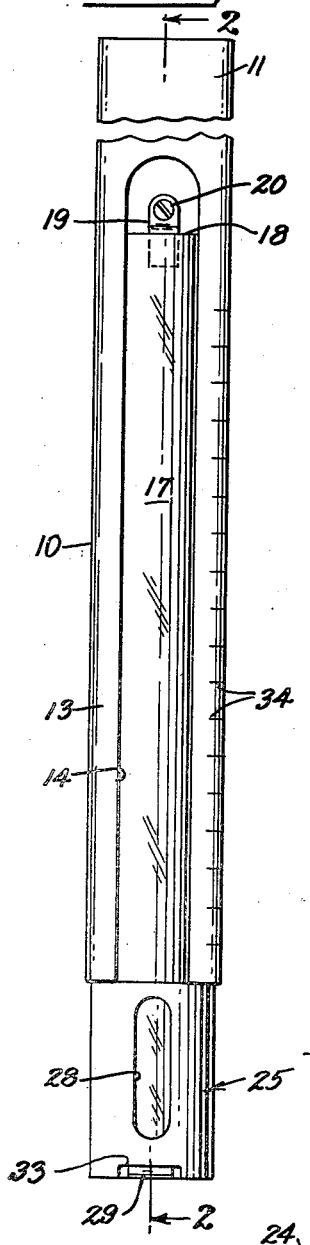
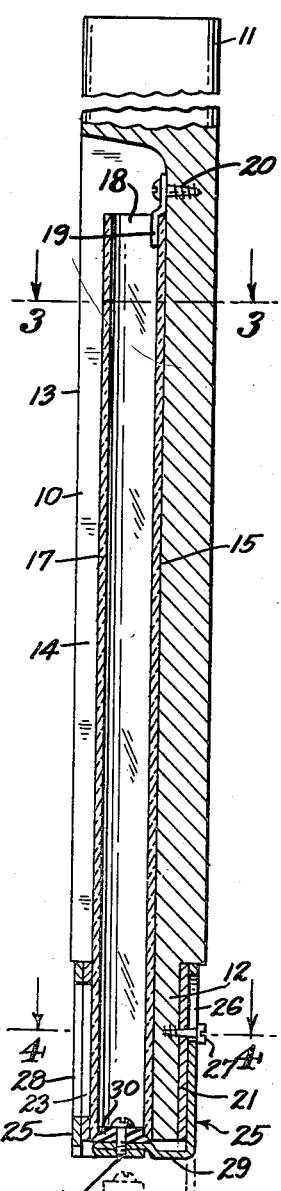
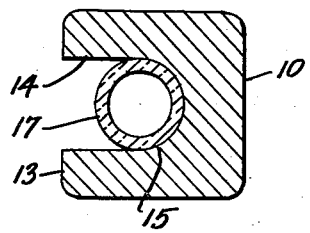
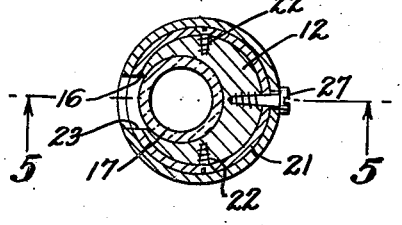
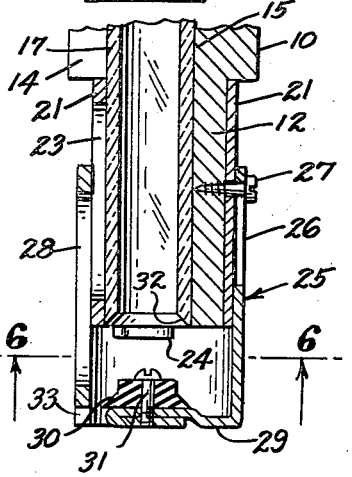
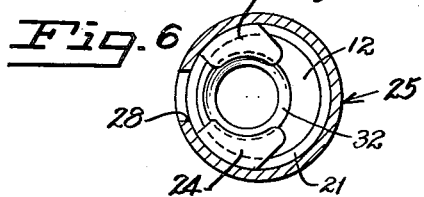
INVENTOR.
WALTER P. WEIDINGER
BY
ATTORNEY

Patented Jan. 1, 1952

2,580,711

UNITED STATES PATENT OFFICE 2,580,711

LIQUID GAUGE BAR

Walter P. Weidinger, Orinda, Calif.

Application August 15, 1949, Serial No. 110,407

6 Claims. (Cl. 73—425.4)

This invention relates to liquid gauges and more particularly to such gauges of the stick type.

The purposes of the invention are to provide a liquid gauge efficient in operation and simple in construction for drawing a sample of liquid from a tank the bottom of which is not available for visual inspection. Such tanks are frequently buried in the ground such as those containing inflammable fluids, or the tanks may be above ground and of opaque material. The present invention is not essentially to indicate a quantity of liquid contents but rather to readily indicate the quality of the liquid, though if it were employed with tanks of uniform size and shape it may be calibrated as usual for incidentally indicating quantity of contents.

Briefly, the invention comprises a rod or stick of suitable length of nice finish provided with a channelled groove having disposed therein a transparent tube open at top and bottom, and a valve means at the lower end of the tube normally open when the gauge stick and tube are being inserted into liquid in a tank, and closable by pressure contact with the bottom of the tank.

One form in which the invention may be exemplified is described herein and illustrated in the accompanyig drawing, it being understood that the one form illustrated and described is not a limitation of the invention which, in its broader aspects, is defined in the appended claims.

In the accompanying drawing:

Fig. 1 is a front elevation of the gauge of the invention.

Fig. 2 is a vertical sectional view on line 2—2 of Fig. 1.

Fig. 3 is an enlarged horizontal transverse section on line 3—3 of Fig. 2.

Fig. 4 is an enlarged horizontal transverse section on line 4—4 of Fig. 2.

Fig. 5 is an enlarged fragmentary vertical section of a portion of structure of Fig. 2, showing a sleeve at extended position.

Fig. 6 is a horizontal transverse section on line 6—6 of Fig. 5.

Referring to the drawing in which like reference characters indicate corresponding parts in the several views, 10 is a nicely finished rod or stick member of suitable length according to the depth of tanks in which the gauge is to be employed. Manifestly, the greater the depth of the tank the longer the gauge stick should be. The stick member is preferably substantially generally square in lateral transverse section for the greater portion of its length, as shown in Fig. 3, its angular longitudinal corners being rounded. As its upper end the stick is provided with a hand-grip portion 11 by which the stick may be manually lowered into and withdrawn from a tank. The opposite or lower end portion of the stick is cylindrically turned as best shown in Fig. 4 to provide a cylindrical stub 12.

At one face of the stick, designated as its front face 13, is provided a channelled open faced groove 14 preferably stopping short of the upper end of the stick so as not to extend through the handle portion 11. The groove is continued through the cylindrical stub 12 as a cylindrical bore 15 axially aligned with groove 14 and sufficiently eccentric with relation to the stub so that a portion of the circumference of the bore is closely adjacent the exterior circumference of the stub, whereby an elongated slot 16 may be cut longitudinally through the wall of the stub as a sight opening into the bore.

A hollow transparent cylindrical tube 17 open at both its ends is mounted in the groove 14 and extends through the bore 15 to the end of the stub, preferably closely fitting in the bore for support at one of its ends, and having its opposite end spaced adjacently to the opposite end of the groove, as at 18, where the wall of the tube is engaged by a clip 19 secured to the stick within the groove by screw 20.

The exterior circumference of the stub 12 is surrounded by a snugly fitted ferrule 21 secured to the stub by countersunk screws 22, the ferrule being provided with a sight opening 23 overlying the elongated slot 16 of the stub member. The lower free end of the ferrule may have integrally formed wing or lug portions 24 flanged radially inwardly to provide stop means to contact the outer circumference of the end of tube 17 and hold it against downward slippage in the groove 14 and bore 15, such engagement, however, not covering the end of the tube wall sufficiently to include a tube bevel or a valve member to be further described.

A hollow sleeve 25 slidably and telescopically encloses the stub 12 and ferrule 21, the fit between the sleeve and ferrule being with sufficient snugness to provide friction to prevent casual or inadvertent movement of the sleeve from weight of fluid in the tube 17. The sleeve is limited in its axially outward sliding movement by a slot 26, closed at both ends and the edges of which engage under the head of a screw 27 set through the ferrule and into the stub member, thereby also preventing the sleeve from rotation relative to the extended stub and ferrule, and further serving as a means for regulating the slidability of the sleeve by tightening or loosening the screw. The sleeve member is also provided with an elongated sight opening 28 which overlies the sight opening 23 of the barrel and slot 16 of the stub member. The lower free end of the sleeve is open, and has an arm 29 extended radially inwardly sufficiently to provide an area underlying the bore 15 and the open end of the tube 17 therein.

Upon the area of arm 29 underlying the open end of tube 17 is mounted a closure gland or valve 30, by means of a screw 31 therethrough, the valve being preferably tapered, and having diameter to seat in and seal the lower open end of the tube 17. Preferably the open end of the tube 17 is bevelled at its inner edge as at 32 to facilitate a tight seat for the taper of the valve. The area of the arm underlying the valve 30 preferably is of double thickness to provide adequate threads to receive and hold the screw 31.

At some portion of the circumference of the lower free edge of the sleeve 25 is a relatively large cut-out portion 33, the purpose of which will be described in connection with the operation of the gauge.

If desired, the usual calibrations 34 may be indicated along the stick in any suitable manner to indicate the quantity of liquid in a tank.

Having described the physical structural elements, the mode of operations thereof consist in first opening the valve at the lower open end of the tube by sliding the sleeve 25 to the limit of the key slot 26 which frees the valve 30 from closure seat at the end of the tube 17. Manually manipulating the stick by means of the hand grip portion 11, its opposite end is inserted into a tank containing the liquid from which the sample is to be taken. The insertion of the stick should be gradual to avoid agitation of the liquid. As the tube is gradually immersed, the liquid enters through the opening at the lower end of the sleeve 25 and, incidentally, also through the extended portion of the sight opening 28, and by displacement, moves up into the tube progressively as the stick is lowered. If the tube is shorter than the depth of the liquid, the liquid may progressively flow out of the top end of the tube as the tube is immersed. If it is desired to take a sample of the entire depth of the liquid in the tank, the tube should be correspondingly longer to include the entire depth of the liquid. Or, if the dilution or impurities of the tested liquid are of a type that rise to the top of the liquid, so that the desired sample is at the top strata or level, the tube should likewise be of a length to obtain a column of the liquid for its entire depth. Usually, however, especially when testing for water in oily substances or dirt sediment, the foreign matter or impurities will be at the bottom of the tank. When the extended sleeve shall have contacted the bottom of the tank, continued presure will cause the sleeve to slide on the ferrule and cause the sealing gland valve 30 to close the adjacent lower end of the tube and entrap the liquid in the tube, whereupon the gauge may be withdrawn from the tank with the trapped liquid contained therein, representing a substantially true sample of the actual conditions in the liquid at the strata from which the sample is taken. The frictional engagement between the ferrule 21 and sleeve 25, augmented if necessary by tightening screw 27, prevents inadvertent opening of the valve 30 responsive to weight of liquid in the tube.

The relatively large opening 33 in the lowermost circumferential edge of the sleeve serves a dual purpose of providing a large opening for inflow of liquid not excessively agitated although the remainder of the lower edge of the sleeve may be contacting the bottom wall of the tank. And also, when the sleeve is in contact with the bottom wall of the tank, and the stub and ferrule are pressed into the sleeve to close the valve, the large opening will permit the liquid in the hollow portion of the sleeve to be expelled from the sleeve without undue agitation of the sample of liquid to be collected in the tube at the extreme bottom of the tank.

Having described the invention and one form in which it may be exemplified, I claim as new and patentable:

1. A liquid gauge for testing liquid in a tank, comprising an elongated stick member having a longitudinal open-faced channeled groove inset from its face and extending to at least one end of the stick; a transparent tube in said groove, said tube being open at both its ends, a tubular sleeve snugly slidable longitudinally of said one end portion of the stick to which the tube extends, said sleeve being open at its free terminal end, a closure gland valve supported centrally of the open end of the sleeve adapted for selectively opening and closing the adjacent open end of the tube responsive to sliding of said sleeve, said sleeve having a sight opening overlying the opening in the groove at said one end portion of the stick, and the tubular wall of said sleeve having an ancillary opening at its free terminal edge through which liquid may flow when the terminal end opening of the sleeve is closed against a tank bottom.

2. A liquid gauge for testing liquid in a tank, comprising an elongated stick member having a longitudinal open-faced channeled groove inset from its face and extending to at least one end of the stick, a transparent tube in said groove, said tube being open at both its ends, a tubular sleeve snugly slidable longitudinally of said one end portion of the stick to which the tube extends, said sleeve being open at its free terminal end, a closure gland valve supported centrally of the open end of the sleeve adapted for selectively opening and closing the adjacent open end of the tube responsive to sliding of said sleeve, said sleeve having a sight opening overlying the opening in the groove at said one end portion of the stick, said one end portion of the stick upon which the sleeve is slidable being cylindrical and enclosed by a fixedly mounted cylindrical ferrule having a sight opening in its side wall overlying the opening of the groove in the stick and aligned with the sight opening in the sleeve, said ferrule having an end portion flanged over the adjacent terminal end of the stick and providing lugs extending over the periphery of the end of the groove for supporting the end of the tube member in the groove.

3. A liquid gauge for testing liquid in a tank, comprising an elongated stick member having a cylindrical portion at one end, said stick having a longitudinal open-faced channeled groove inset from its face and extending to the terminal end of said cylindrical end portion, a transparent tube in said groove and extending to the terminal end of said cylindrical end portion, said tube being open at both its ends, a fixedly mounted cylindrical ferrule enclosing said cylindrical end portion of the stick, said ferrule having a sight opening in its side wall overlying the opening of the groove in said cylindrical end portion of the stick, a tubular sleeve snugly slidable longitudinally of said ferrule, the sleeve being open at its free terminal end and having a sight opening in its side wall longitudinally aligned with the sight opening in the ferrule and with the groove of the stick, a closure gland valve supported centrally of the open end of the sleeve adapted for selectively opening and closing the adjacent open end of the tube responsive to sliding of said sleeve, said transparent tube being eccentric to the said cylindrical portion of the stick whereby the tube is closely adjacent to the sight openings of the ferrule and sleeve.

4. A liquid gauge for testing liquid in a tank, including an elongated stick member having a longitudinal channeled open-faced groove inset from a longitudinal face, the stick having an extended cylindrical stub at one end portion having a bore longitudinally therethrough as an extension of said groove, a transparent tube in said groove, said tube being open at both its ends and one end of said tube extending to the end of the groove at the free end of the cylindrical stub portion, a tubular sleeve snugly slidable longitudinally of the cylindrical stub portion, said sleeve being open at its free terminal end, a closure gland valve supported centrally of the open end of the sleeve adapted for selectively opening and closing the adjacent open end of the tube responsive to sliding said sleeve, the wall of said sleeve having an ancillary opening at its free terminal end through which liquid may flow when the terminal end opening of the sleeve is closed against the tank bottom.

5. A liquid gauge for testing liquid in a tank including an elongated stick member having a longitudinal channeled open-faced groove inset from a longitudinal face of the stick, the stick having an extended cylindrical stub at one end portion having therein a bore longitudinally therethrough as an extension of said groove, a transparent tube in said groove, said tube being open at both its ends, one end of said tube extending to the end of the groove at the free end of the cylindrical stub portion, a tubular sleeve snugly slidable longitudinally of the cylindrical stub portion, said sleeve being open at its free terminal end, a closure gland valve supported centrally of the open end of the sleeve adapted for selectively opening and closing the adjacent open end of the tube responsive to sliding of said sleeve, the tubular sleeve having a sight opening overlying the opening in the groove of the cylindrical stub portion, and the transparent tube being eccentric to said cylindrical portion whereby the tube is closely adjacent the sight opening of the sleeve.

6. A liquid gauge for testing liquids in a tank comprising an elongated stick member having a longitudinal channelled open-faced groove inset from its face and extending to at least one end of the stick, the stick having at said one end portion an extended cylindrical stub having a bore longitudinally therethrough as an extension of said groove, a transparent tube in said groove, said tube being open at both its ends, one end of said tube extending to the end of the groove at the free end of the cylindrical stub portion, a ferrule fixedly mounted circumferentially of the cylindrical stub portion, a tubular sleeve keyed to and snugly slidable longitudinally of said ferrule of the cylindrical stub portion, said sleeve being open at its lower terminal free end; and a closure gland valve supported centrally of the open end of the sleeve adapted for selectively opening and closing the adjacent open end of the tube responsive to sliding said sleeve, said sleeve and ferrule each having a sight opening overlying the opening in the groove of the cylindrical stub portion, and the wall of said sleeve having an ancillary opening at the free terminal end through which liquid may flow when the terminal end opening of the sleeve is closed against a tank bottom.

WALTER P. WEIDINGER.

REFERENCES CITED

The following references are of record in the file of this patent:

UNITED STATES PATENTS

| Number | Name | Date |
| --- | --- | --- |
| 1,744,193 | Adams | June 21, 1930 |
| 2,067,795 | Skuret et al. | Jan. 12, 1937 |
| 2,451,704 | Wood | Oct. 19, 1948 |

FOREIGN PATENTS

| Number | Country | Date |
| --- | --- | --- |
| 62,609 | Germany | June 2, 1892 |